A. H. SMITH & H. WANAMAKER.
LOCOMOTIVE ASH PAN.
APPLICATION FILED JAN. 14, 1913.

1,114,196.

Patented Oct. 20, 1914.
3 SHEETS—SHEET 1.

Witnesses
Wm. Janus.
M. O. Smith

Inventors
Alfred H. Smith
Harry Wanamaker
By J. R. Cromwell. Atty.

A. H. SMITH & H. WANAMAKER.
LOCOMOTIVE ASH PAN.
APPLICATION FILED JAN. 14, 1913.
1,114,196.
Patented Oct. 20, 1914.
3 SHEETS—SHEET 2.
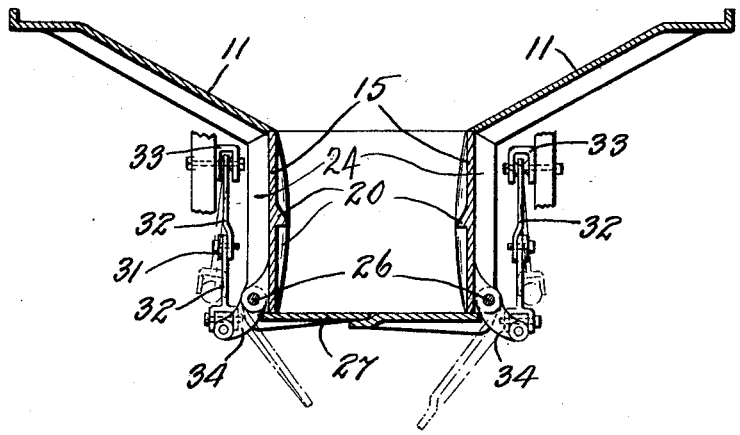
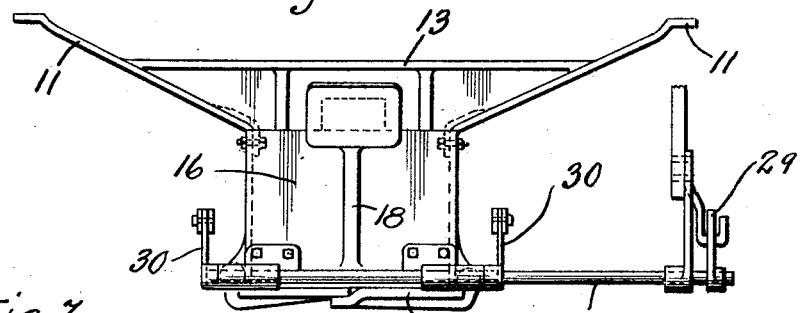
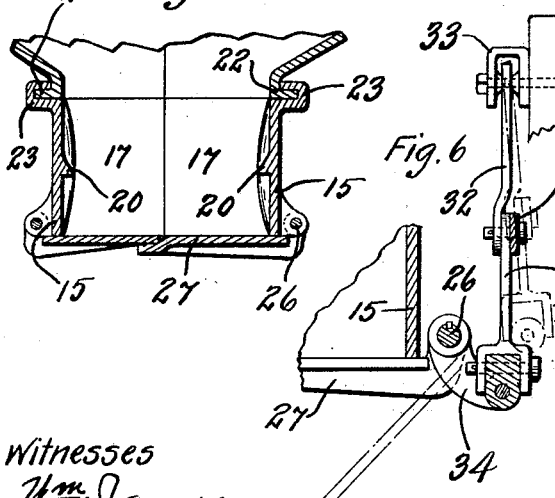
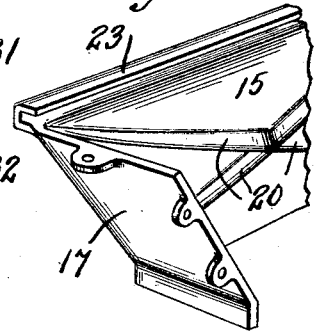
Witnesses
Inventors
Alfred H. Smith
Harry Wanamaker
By _____ Att'y.

A. H. SMITH & H. WANAMAKER.
LOCOMOTIVE ASH PAN.
APPLICATION FILED JAN. 14, 1913.
1,114,196.
Patented Oct. 20, 1914.
3 SHEETS—SHEET 3.
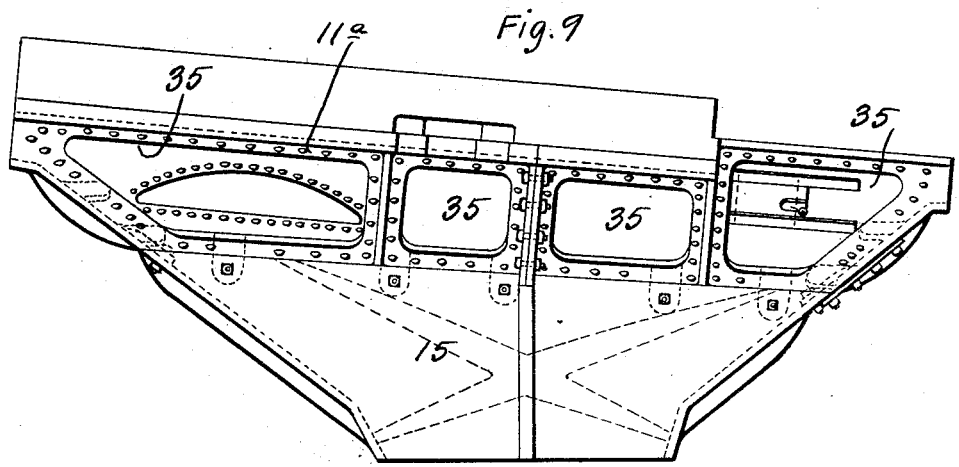
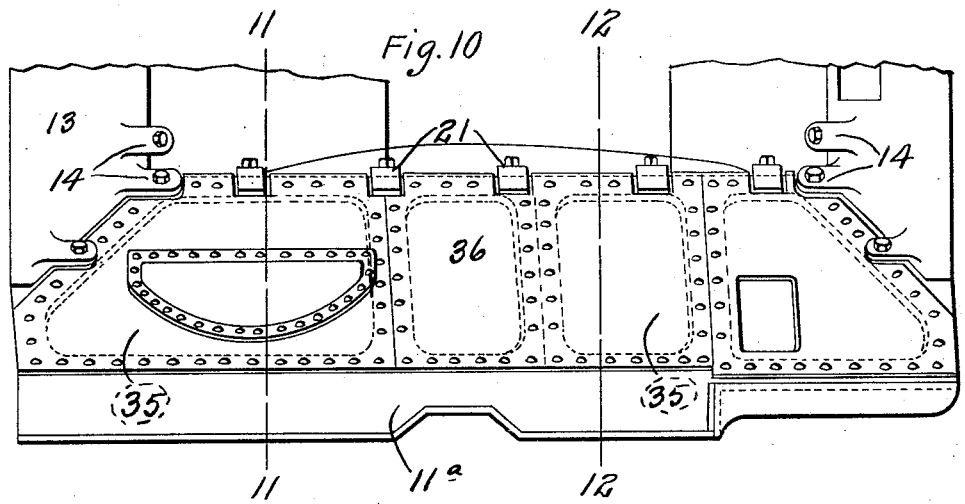
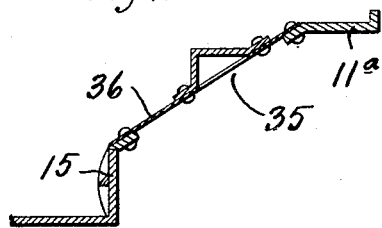
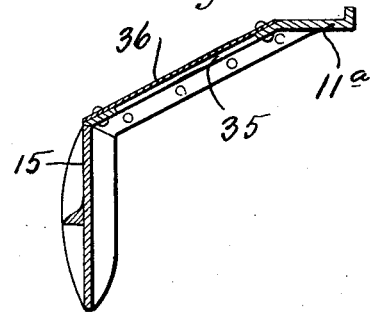
Witnesses
Wm Janus.
Inventors
Alfred H. Smith
Harry Wanamaker
By Cornwall, Att'y.

UNITED STATES PATENT OFFICE.

ALFRED H. SMITH, OF NEW YORK, AND HARRY WANAMAKER, OF ALBANY, NEW YORK.

LOCOMOTIVE ASH-PAN.

1,114,196. Specification of Letters Patent. Patented Oct. 20, 1914.

Application filed January 14, 1913. Serial No. 741,995.

*To all whom it may concern:*

Be it known that we, ALFRED H. SMITH and HARRY WANAMAKER, citizens of the United States, and residing, respectively, in the city of New York, State of New York, and Albany, New York, have invented certain new and useful Improvements in Locomotive Ash-Pans, of which the following is a full, clear, and exact description, such as will enable others skilled in the art to which it appertains to make and use the same, reference being had to the accompanying drawings, forming part of this specification.

Our invention relates generally to new and useful improvements in locomotive fire boxes, and more particularly to the ash pan which is connected to and depends from the lower portion of the hopper, which latter is positioned beneath the fire box.

Our invention further relates to the doors which normally close the bottom of the ash pan, and to the door opening and closing mechanism.

The principal object of our invention is to construct an ash pan in one or more parts, preferably of cast metal, and the walls of which ash pan are reinforced strengthening ribs so that said pan will not warp or buckle out of shape as a result of the heat from the ashes contained within said pan.

A further object of our invention is to provide an ash pan which is simple, strong and durable, comparatively light in weight, and arranged and constructed so as to be easily and quickly detached from the hopper in case of repairs without the necessity of removing one or more of the engine axles and the wheels thereon.

With the above and other objects in view, our invention consists in certain novel features of construction and arrangement of parts hereinafter more fully described and claimed.

Figure 1:
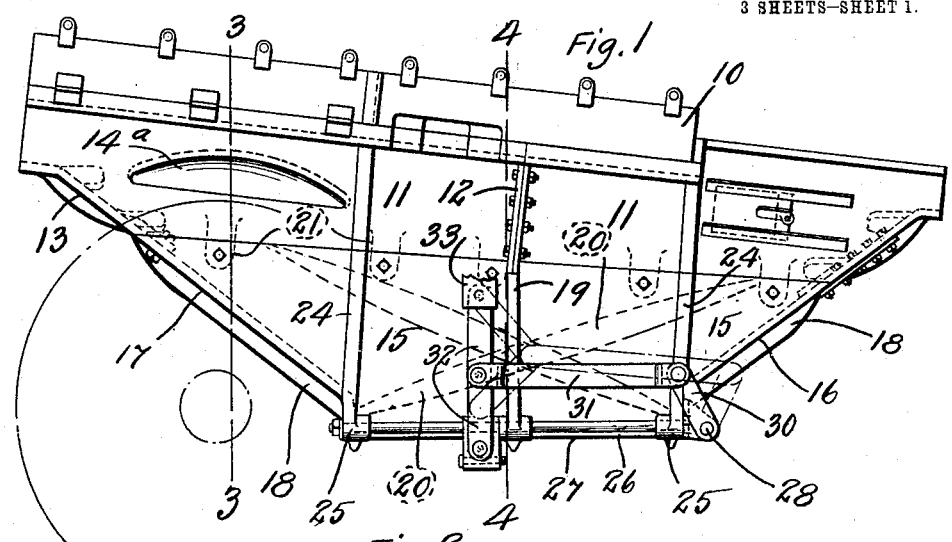
Figure 2:
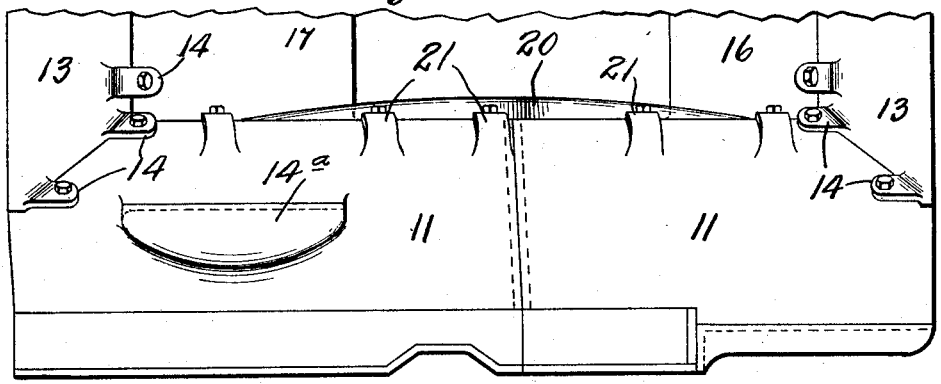
Figure 3:
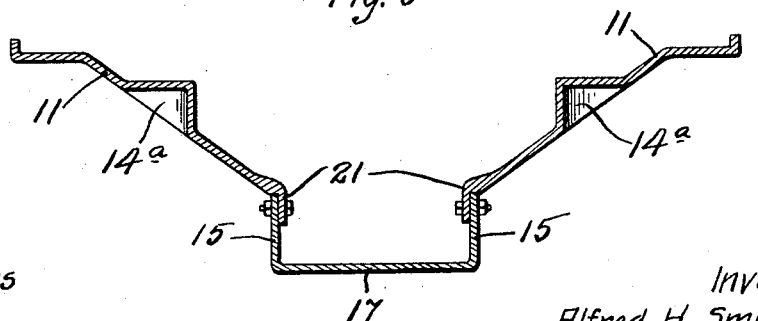

In the drawings: Figure 1 is a side elevation of our improved ash pan and its hopper, the same being shown applied to the bottom of a locomotive fire box. Fig. 2 is a top plan view of one-half of the ash pan and hopper. Fig. 3 is a transverse section taken approximately on the line 3—3 of Fig. 1. Fig. 4 is a transverse section taken approximately on the line 4—4 of Fig. 1. Fig. 5 is a front elevational view of our improved ash pan. Fig. 6 is an enlarged detail sectional view of one of the ash pan door-operating mechanisms. Fig. 7 is a cross-sectional view of a modified form of our improved ash pan, and showing an interlocking connection between the upper edges of said pan and the hopper. Fig. 8 is a detail perspective view of a portion of the modified form of our pan. Fig. 9 is a side elevational view of a modified construction wherein the hopper is made up of a series of frames or plates provided with openings which are closed by thin metal plates. Fig. 10 is a plan view of one-half of the hopper and ash pan seen in Fig. 9. Fig. 11 is a detail section taken approximately on the line 11—11 of Fig. 10. Fig. 12 is a detail section taken approximately on the line 12—12 of Fig. 10.

Referring by numerals to the accompanying drawings, 10 designates the lower portion of the locomotive fire box, and attached thereto in any suitable manner are the upper edges of the walls of the hopper. This hopper depends from the fire box and carries at its lower end the ash pan, and as contemplated by our invention, the side walls 11 which extend downward and inward from the sides of the fire box 10 are each formed in two or more sections, the meeting edges of which are united in any suitable manner, preferably by means of bolts or rivets which pass through outwardly projecting flanges 12 formed on said meeting edges.

The line of separation between the two parts of each side wall is at a point approximately mid-way between the ends of the hopper, and uniting the end portions of these side walls are downwardly and inwardly projecting end walls 13, the edges of which are attached to the corresponding edges of the side walls in any suitable manner, preferably by means of bolts or rivets passing through lugs or ears 14 which are formed integral with said end walls and lie upon the inner surfaces of the side walls.

It will be noted that in our improved construction the hopper is constructed of six parts; namely, the side walls each constructed in two parts and the two end walls.

Formed in the rear portions of the inclined side walls 11 are pockets 14ª which accommodate the upper portions of a pair of the locomotive wheels during the vertical movement of the hopper and fire box relative to said wheels.

The ash pan proper, as contemplated by our invention, is preferably constructed in a single piece by casting and comprises side walls 15, a front end wall 16 which is inclined to correspond with the inclination of the front end wall of the hopper, and a rear end wall 17 which is inclined to correspond with the rear end wall of the hopper.

If desired the front and rear end walls 16 and 17 may be provided with centrally arranged strengthening ribs 18 which materially reinforce said end walls and prevent same from warping or buckling from heat. Likewise the side walls 15 may be provided with vertically disposed, exteriorly arranged strengthening ribs 19, and formed integral with the side walls 15 and on the insides thereof are diagonally disposed, intersecting strengthening ribs or flanges 20 which are for the purpose of reinforcing the side walls or plates and preventing the same from warping or buckling from the heat of the ashes within said ash pan. The top surfaces of these reinforcing ribs 20 are preferably inclined downwardly so as to readily permit the ashes to pass downward without lodgment and consequent choking.

The upper edges of the walls of the ash pan are detachably secured to the lower edges of the walls of the hopper in any suitable manner, preferably by means of bolts or rivets which pass through ears or lugs 21, the same being formed integral with the walls of the hopper and extending downward against the inner faces of the walls of the ash pan.

In some instances it may be found desirable to attach the ash pan to the hopper in the manner shown in Fig. 7, and where such arrangement is employed flanges 22 are formed integral with and project outwardly from the lower edges of the side walls of the hopper, which flanges are engaged by overhanging lips or flanges 23 formed on the upper edges of the side walls of the ash pan. In this modified construction it is preferable to form the ash pan in two parts, as shown in Figs. 7 and 8, the line of separation between said parts being at the centers of the end walls 16 and 17. This modified construction permits the ready removal of the ash pan from the hopper, as it is only necessary to remove the fastening devices between the two parts or sections of the ash pan and then separate said parts or sections until the overhanging lips or flanges 23 are disengaged from the flanges 22.

Formed integral with the side walls 15 of the ash pan and on the exterior thereof are vertically disposed strengthening ribs 24, the lower ends of which terminate in bearings 25, and journaled in these bearings are shafts 26 to which are fixed the outer edges of plates 27, the same constituting drop doors for the bottom of the ash pan. One of these plates or doors is slightly wider than the other so that its free edge overlaps the corresponding edge of the opposite door.

Journaled in suitable bearings on the lower portion of the end wall 16 is a transversely disposed shaft 28, one end of which is extended and provided with a lever 29 by means of which said shaft may be readily rocked. Fixed on this rock shaft adjacent to the sides of the ash pan are short, vertically disposed levers 30, and pivotally connected to the upper end of each lever is a horizontally disposed link 31.

The links 31 extend rearwardly along the sides of the ash pan, and their rear ends are pivotally connected to the meeting ends of a pair of vertically disposed toggle links 32, the upper end of the upper one of each of which links is pivotally connected to a bearing 33 on a fixed portion of the locomotive frame. The lower end of each lowermost link 32 is pivotally connected to the outer end of a short, curved arm 34, the upper, inner end of which arm is fixed in any suitable manner to the central portion of the corresponding shaft 26.

The mechanism just described provides means for simultaneously opening or closing the drop doors 27. When the shaft 28 is rocked so as to move the levers 30 into the positions seen in Fig. 1, the links 31 will be drawn forwardly, thereby actuating the toggle links, and as the upper end of the upper one of each pair of links operates in fixed bearings, the lower links will be drawn upward, as shown by dotted lines in Fig. 1, thereby pulling the ends of the arms 34 forwardly and outwardly, which movement rocks the shafts 26 and swings the doors 27 downward, as shown by dotted lines in Fig. 4, thereby permitting the ashes to discharge from the ash pan. A reverse rocking movement of the shaft 28 brings about a reverse movement of the parts just described, and as a result, the drop doors are moved into their normal closed positions.

In the modified construction illustrated in Figs. 9 to 12 inclusive the side walls 11$^a$ of the hopper are formed with openings 35, and which openings are normally closed by thin plates 36 of sheet metal, which construction materially decreases the weight of the hopper without affecting the strength and rigidity thereof.

A locomotive ash pan and hopper of our improved construction is comparatively simple, can be produced at comparatively little cost, can be easily and quickly placed in position upon or removed from the fire box, and the ash pan proper can be very readily removed from the hopper without the necessity of removing parts of the locomotive, such as the axles and wheels.

By reinforcing the side walls of the ash pan with ribs or flanges, said pan is materially strengthened and reinforced against buckling or warping from the heat of the live coals and ashes which discharge from the fire box into said ash pan.

It will be readily understood that minor changes in the size, form and construction of the various parts of our improved ash pan and hopper can be made and substituted for those herein shown and described without departing from the spirit of our invention, the scope of which is set forth in the appended claims.

We claim:

1. The combination with a locomotive fire box, of a hopper connected to and depending from said fire box, flanges on the lower portions of the side walls of the hopper, an ash pan formed in two parts, each comprising a side wall and a pair of end walls, overhanging lips on the upper edges of the side walls of the ash pan, which lips engage the flanges on the lower portions of the side walls of the hopper, and diagonally disposed intersecting strengthening ribs formed on the inner faces of the side walls of the ash pan.

2. The combination with a locomotive fire box, of a hopper connected to and depending from said fire box, flanges on the lower portions of the side walls of the hopper, an ash pan formed in two parts, each comprising a side wall and a pair of end walls, overhanging lips on the upper edges of the side walls of the ash pan, which lips engage the flanges on the lower portions of the side walls of the hopper, and diagonally disposed intersecting strengthening ribs formed on the inner faces of the side walls of the ash pan, the upper surfaces of which strengthening ribs are inclined downward to permit the ashes to readily pass said ribs.

3. The combination with a locomotive fire box, of a hopper connected to and depending from said fire box, flanges on the lower portions of the side walls of the hopper, an ash pan formed in two parts, each comprising a side wall and a pair of end walls, overhanging lips on the upper edges of the side walls of the ash pan, which lips engage the flanges on the lower portions of the side walls of the hopper, diagonally disposed intersecting strengthening ribs formed on the inner faces of the side walls of the ash pan, and drop doors hinged to the lower portions of the side walls of the ash pan for closing the opening at the bottom thereof.

4. The combination with a locomotive fire box, of a hopper connected to and depending from said fire box, flanges on the lower portions of the side walls of the hopper, an ash pan formed in two parts, each comprising a side wall and a pair of end walls, overhanging lips on the upper edges of the side walls of the ash pan, which lips engage the flanges on the lower portions of the side walls of the hopper, diagonally disposed intersecting strengthening ribs formed on the inner faces of the side walls of the ash pan, the upper surfaces of which strengthening ribs are inclined downward to permit the ashes to readily pass said ribs, and drop doors hinged to the lower portions of the side walls of the ash pan for closing the opening at the bottom thereof.

5. As a new article of manufacture, a cast metal ash pan for locomotives provided with comparatively long narrow side walls, vertically disposed strengthening ribs on the external faces of said side walls and diagonally disposed intersecting strengthening ribs on the inner faces of said walls, the top surfaces of which diagonally disposed strengthening ribs are inclined downwardly to permit the ready passage of ashes over said ribs.

6. The hereindescribed cast metal ash pan for locomotives comprising a pair of vertically disposed side walls which are comparatively long and narrow, a pair of inclined end walls, vertically disposed strengthening ribs on the external faces of said side and end walls, and diagonally disposed intersecting strengthening ribs on the inner faces of the side walls.

7. The hereindescribed cast metal ash pan for locomotives, comprising a pair of vertically disposed side walls which are comparatively long and narrow, a pair of inclined end walls, vertically disposed strengthening ribs on the external faces of said side and end walls, and a pair of diagonally disposed intersecting strengthening ribs on the inner faces of the side walls, the top surfaces of which diagonally disposed strengthening ribs are inclined downwardly to permit the ready passage of ashes past said ribs.

8. A locomotive ash pan formed of cast metal and provided with comparatively long narrow side walls, ribs formed integral with said side walls on the inner and outer faces thereof, which ribs are arranged and disposed so as to resist warping tendencies of said side walls, due to heat, and the ribs on the inner faces of said walls being inclined downwardly to permit the ready passage of ashes past said ribs.

9. As a new article of manufacture, a cast metal ash pan for locomotives, the same comprising side and end walls, and strengthening ribs formed on the inner faces of the side walls, which ribs extend substantially lengthwise of said walls.

10. As a new article of manufacture, a cast metal ash pan for locomotives, the same comprising side and end walls, strengthening ribs formed on the inner faces of the side walls, which ribs extend substantially lengthwise of said walls, and the top surfaces of which strengthening ribs are inclined downwardly to permit the ready passage of ashes over said ribs.

11. A cast metal ash pan for locomotives, comprising side and end walls, diagonally disposed strengthening ribs formed on the inner faces of said walls, and the top surfaces of which strengthening ribs are inclined downwardly to permit the ready passage of ashes over said ribs.

12. A cast metal ash pan for locomotives, comprising side and end walls, diagonally disposed intersecting strengthening ribs formed on the inner faces of the side walls, and the top surfaces of which ribs are inclined downwardly to permit the ready passage of ashes over said ribs.

13. A cast metal ash pan for locomotives, comprising a pair of vertically disposed parallel side walls, inclined end walls, and strengthening ribs formed on the inner faces of the parallel side walls, the top surfaces of which ribs are inclined downwardly to permit the ready passage of ashes over said ribs.

14. As a new article of manufacture, a locomotive ash pan constructed of cast metal, and strengthening ribs formed on the inner faces of the side walls of said pan, the top surfaces of which ribs are inclined downwardly to permit the ready passage of ashes over said ribs.

In testimony whereof, we have hereunto affixed our signatures in the presence of two subscribing witnesses.

ALFRED H. SMITH.
HARRY WANAMAKER.

Witnesses to the signature of Alfred H. Smith:
J. M. WOOLDRIDGE,
J. V. DESMOND.

Witnesses to the signature of Harry Wanamaker:
GEORGE A. CLARE,
ERNEST V. WILLIAMS.

Copies of this patent may be obtained for five cents each, by addressing the "Commissioner of Patents, Washington, D. C."